US012783232B2

(12) United States Patent
Roedel et al.

(10) Patent No.: US 12,783,232 B2
(45) Date of Patent: Nov. 3, 2026

(54) OBJECT IDENTIFICATION CODE DECODING SCHEMES VIA REGULAR EXPRESSIONS

(71) Applicant: SAP SE, Walldorf (DE)

(72) Inventors: Bernd Roedel, Düsseldorf (DE); Tobias Buschmann, Velbert (DE)

(73) Assignee: SAP SE, Walldorf (DE)

( * ) Notice: Subject to any disclaimer, the term of this patent is extended or adjusted under 35 U.S.C. 154(b) by 727 days.

(21) Appl. No.: 18/196,847

(22) Filed: May 12, 2023

(65) Prior Publication Data

US 2024/0378052 A1 Nov. 14, 2024

(51) Int. Cl.

| | |
|---|---|
| ***G06F 9/44*** | (2018.01) |
| ***G06F 8/41*** | (2018.01) |
| ***G06F 8/73*** | (2018.01) |
| ***G06K 7/14*** | (2006.01) |

(52) U.S. Cl.

CPC ................ *G06F 8/73* (2013.01); *G06F 8/427* (2013.01); *G06K 7/1486* (2013.01)

(58) Field of Classification Search

None

See application file for complete search history.

(56) References Cited

U.S. PATENT DOCUMENTS

2019/0392075 A1* 12/2019 Han ...................... G06F 16/285
2022/0292157 A1* 9/2022 Perez ................. G06Q 30/0281
2024/0339208 A1* 10/2024 Beall ....................... G06F 8/427

FOREIGN PATENT DOCUMENTS

CN 104835045 A * 8/2015
CN 115270829 A * 11/2022 ........... G06K 7/0095

OTHER PUBLICATIONS

"Global Trade Item Number (GTIN)," GS1, gs1.org, 2015, 1 page.
"GS1 General Specifications Standard," GS1, gs1.org, Jan. 2023, 500 pages.
"GTIN Management Standard," GS1, gs1.org, Jun. 2016, 18 pages.
"Regular Expression," *Wikipedia*, en.wikipedia.org, Feb. 28, 2023, 29 pages.
"Regular expression syntax cheat sheet," mdn web docs, developer.mozilla.org, visited Mar. 7, 2023, 13 pages.
"IMG Tool Sap," SAP SE, printed Mar. 9, 2023, 4 pages.
"SAP Extended Warehouse Management (SAP EWM): Receipt of Handling Units Using RF," help.sap.com, printed Mar. 10, 2023, 3 pages.
Narayan, "GS1-128 Barcode Understanding and Technical Details," blogs.sap.com, Feb. 22, 2021, 12 pages.

* cited by examiner

*Primary Examiner* — Insun Kang
(74) *Attorney, Agent, or Firm* — Klarquist Sparkman, LLP

(57) ABSTRACT

Object identification codes can be decoded via an object identification code decoding scheme definition having regular expressions. The definition is configurable via editing non-programming-code text representing the definition. A variety of decoding schemes can be supported, including GS1-based schemes, and other schemes that support order-based decoding, multiple field occurrences, and the like. Fields can be implemented as global field names. The technologies are useful for providing flexible object identification code decoding without having to engage in cumbersome programmatic decoding approaches. Barcode, radio frequency identification (RFID), and near-field communication (NFC) implementations can be supported.

18 Claims, 10 Drawing Sheets

BARCODE DSD 710

| COUNTER 720A | FIELD NAME 720B | REMOVE LZ'S 720C | ADD'L CHECKS 720D | REGEX 720E |
|---|---|---|---|---|
| 10 | MATERIAL | | NO ADD'L CHECK | ^([\X21-\X22\X25-\X2F\X30-\X39\X3A-\X3F\X41-\X5A\X5F\X61-\X7A]*)# |
| 20 | BATCH | | NO ADD'L CHECK | ^([\X21-\X22\X25-\X2F\X30-\X39\X3A-\X3F\X41-\X5A\X5F\X61-\X7A]*)# |
| 30 | SERIAL NUMBER | | NO ADD'L CHECK | ^([\X21-\X22\X25-\X2F\X30-\X39\X3A-\X3F\X41-\X5A\X5F\X61-\X7A]*)$ |

750

COPPER17#S23#08378474

RESULTS TABLE 795

| GFN | VALUE |
|---|---|
| MATERIAL | COPPER17 |
| BATCH | S23 |
| SERIAL NUMBER | 08378474 |

FIG. 7

<table>
<tr><th colspan="5">BARCODE DSD 810</th></tr>
<tr><th>COUNTER 820A</th><th>FIELD NAME 820B</th><th>REMOVE LZ'S 820C</th><th>ADD'L CHECKS 820D</th><th>REGEX 820E</th></tr>
<tr><td>10</td><td>PREFIX</td><td></td><td>NO ADD'L CHECK</td><td>^(]..)#?</td></tr>
<tr><td>20</td><td>MATERIAL</td><td></td><td>NO ADD'L CHECK</td><td>^240([\X26-\X2F\X30-\X39\X3A-\X3F\X41-\X5A\X5F\X61-\X7A]{0,40})(#|$)</td></tr>
<tr><td>30</td><td>PRODUCTSTDID</td><td>X</td><td>001 DIGIT MOD 10</td><td>^01(\D{14})#?</td></tr>
<tr><td>40</td><td>BATCH</td><td></td><td>NO ADD'L CHECK</td><td>^10([\X26-\X2F\X30-\X39\X3A-\X3F\X41-\X5A\X5F\X61-\X7A]{0,20})(#|$)</td></tr>
<tr><td>50</td><td>MANUFDATE</td><td></td><td>002 DATE FORM</td><td>^11(\D{6})#?</td></tr>
<tr><td>60</td><td>SELFEXPDATE</td><td></td><td>002 DATE FORM</td><td>^15(\D{6})#?</td></tr>
<tr><td>70</td><td>SHELFEXPDATE</td><td></td><td>002 DATE FORM</td><td>^17(\D{6})#?</td></tr>
<tr><td>80</td><td>SERIALNUMBER</td><td></td><td>NO ADD'L CHECK</td><td>^21([\X26-\X2F\X30-\X39\X3A-\X3F\X41-\X5A\X5F\X61-\X7A]{0,20})(#|$)</td></tr>
<tr><td>90</td><td>QUANTITY</td><td></td><td>NO ADD'L CHECK</td><td>^30(\D{0,8})(#|$)</td></tr>
<tr><td>100</td><td>DELIVERDOCBYS</td><td></td><td>NO ADD'L CHECK</td><td>^90([\X26-\X2F\X30-\X39\X3A-\X3F\X41-\X5A\X5F\X61-\X7A]{0,30})(#|$)</td></tr>
<tr><td>110</td><td>PREFIX</td><td></td><td>NO ADD'L CHECK</td><td>^(]..)%?</td></tr>
<tr><td>120</td><td>MATERIAL</td><td></td><td>NO ADD'L CHECK</td><td>^240([\X26-\X2F\X30-\X39\X3A-\X3F\X41-\X5A\X5F\X61-\X7A]{0,40})(%|$)</td></tr>
<tr><td>130</td><td>PRODUCTSTDID</td><td>X</td><td>001 DIGIT MOD 10</td><td>^01(\D{14})%?</td></tr>
<tr><td>140</td><td>BATCH</td><td></td><td>NO ADD'L CHECK</td><td>^10([\X26-\X2F\X30-\X39\X3A-\X3F\X41-\X5A\X5F\X61-\X7A]{0,20})(%|$)</td></tr>
<tr><td>150</td><td>MANUFDATE</td><td></td><td>002 DATE FORM</td><td>^11(\D{6})%?</td></tr>
</table>

FIG. 8

OBJECT IDENTIFICATION CODE DECODING SCHEMES VIA REGULAR EXPRESSIONS

FIELD

The field generally relates to decoding object identification codes.

BACKGROUND

Object identification codes can be used in a variety of scenarios. For example, in the field of barcodes, a common public format is GS1. Under the GS1 format, a barcode field is identified by an application identifier, and the value of the field follows the identifier.

The task of decoding the barcode can be complex. For example, different domains and organizations may use different field names. In practice, an organization may wish to create its own decoding scheme within the confines of the GS1 format. However, doing so can prove to be cumbersome. One particular challenge is how to achieve scheme decoding. Such decoding typically involves either writing code to parse the barcode or engaging a user interface that supports a limited number of scenarios.

There thus remain various opportunities for improvement in object identification code decoding.

BRIEF DESCRIPTION OF THE DRAWINGS

FIG. 7 is a block diagram of an example barcode decoding scheme definition, a barcode input string, and the decoded output.

FIG. 8 is a block diagram of an example barcode decoding scheme definition.

DETAILED DESCRIPTION

Example 1—Overview

Powerful yet flexible technologies for decoding object identification codes can operate without requiring programmatic coding to achieve decoding. A rich variety of object identification code decoding schemes can thus be supported in practice.

Although some examples describe barcodes, similar issues arise when decoding codes from radio frequency identification (RFID) tags, near-field communication (NFC) tags or devices, and the like.

The technologies described herein can be applied to a variety of auto identification ("Auto ID") scenarios for use in tracking or tracing of materials or products in manufacturing, logistics, retail, inventory management, or the like.

As described herein, an object identification code decoding scheme definition can comprise regular expressions. Such regular expressions can be used to match against an object identification code input string and extract fields. As described herein, an object identification code decoding scheme definition can map regular expressions to fields. Using the definition, an object identification code input string can be transformed into a table of field names and field values that can be processed by any arbitrary application.

As described herein, the object identification code decoding scheme definition can be repeatedly applied against the object identification code input string in a recursive fashion. Configuration information in the object identification code decoding scheme can map the regular expressions to respective field names.

The technologies can support barcode formats such as GS1; however, extensions to or departures from GS1 can also be supported. Any of a variety of custom barcode decoding schemes can be implemented via the regular expressions.

In practice, fields can be global field names that have settled semantics in an enterprise resource planning environment, including a multitenant cloud-based implementation. Fields can be from database tables and configured via a user interface of a relational database system managing the database tables.

As described herein, the object identification code decoding scheme definition is configurable via editing non-programming-code text representing the definition.

A wide variety of other features can be supported as described herein.

The described technologies thus offer considerable improvements over conventional object identification code decoding techniques.

Figure 1:
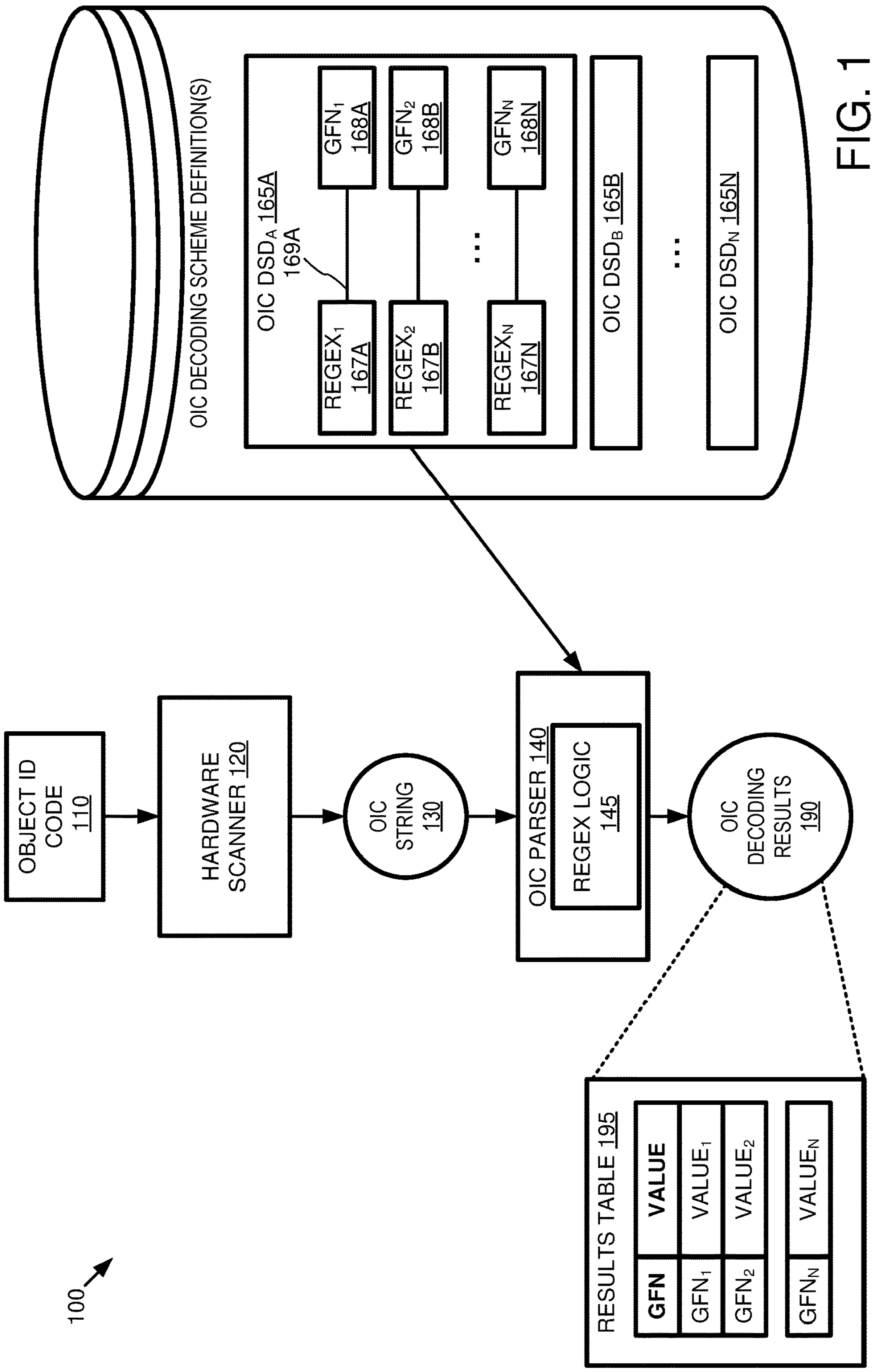
FIG. 1 is a block diagram of an example system implementing object identification code decoding schemes via regular expressions.

Example 2—Example System Implementing Object Identification Code Decoding Schemes Via Regular Expressions FIG. 1 is a block diagram of an example system 100 implementing object identification code ("OIC") decoding schemes via regular expressions. In the example, the system 100 can comprise one or more object identification code scheme definitions 165A-N that can be used to decode an object identification code 110.

In practice, a physical barcode (e.g., printed, displayed, or otherwise optically perceivable), RFID tag, NFC tag or device, or the like can be scanned by a hardware scanner 120 that outputs an object identification code string 130, which is used as an object identification code input string for the technologies. RFID readers and NFC readers can operate in a similar manner.

An object identification code parser 140 executing on a computer system can accept the object identification code input string 130 and apply regular expression logic 145 according to the definition 165A to output the results 190, which can take the form of a results table 195 that comprises one or more field name, value pairs.

A given definition 165A out of the definitions 165-N comprises a plurality regular expressions 167A-N mapped to respective field names 168A-N. A stored relationship (e.g., 169A) can be used to map a regular expression 167A to a respective field name 168A. Such a relationship 169A can be an explicit stored relationship or be implicit (e.g., based on ordering, appearance in a same rule, or the like).

The object identification code parser 140 can operate as described herein to apply the regular expression logic 145 to decode the string 130. Recursive operation can be supported.

In practice, a single object identification code decoding scheme definition can be sufficient under certain circumstances. However, an implementation that supports mapping from an application to a respective object identification code decoding scheme definition can also be supported so that different applications recognize different object identification code schemes.

Although barcodes are shown in some examples, the technologies can be equally applied to scenarios involving RFID technologies, NFC technologies, or the like.

Any of the systems herein, including the system 100, can comprise at least one hardware processor and at least one memory coupled to the at least one hardware processor.

The system 100 can also comprise one or more non-transitory computer-readable media having stored therein computer-executable instructions that, when executed by the computing system, cause the computing system to perform any of the methods described herein.

In practice, the systems shown herein, such as system 100, can vary in complexity, with additional functionality, more complex components, and the like. For example, the definitions 165A-N can include more information, the results table 195 can include more fields, and the like. There can be additional functionality within the decoding process, such as preprocessing, redundancy, error correction, and the like. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the object identification code string 130, definitions 165A-N, results 190, and the like can be stored in one or more computer-readable storage media or computer-readable storage devices. The technologies described herein can be generic to the specifics of operating systems or hardware and can be applied in any variety of environments to take advantage of the described features.

Figure 2:
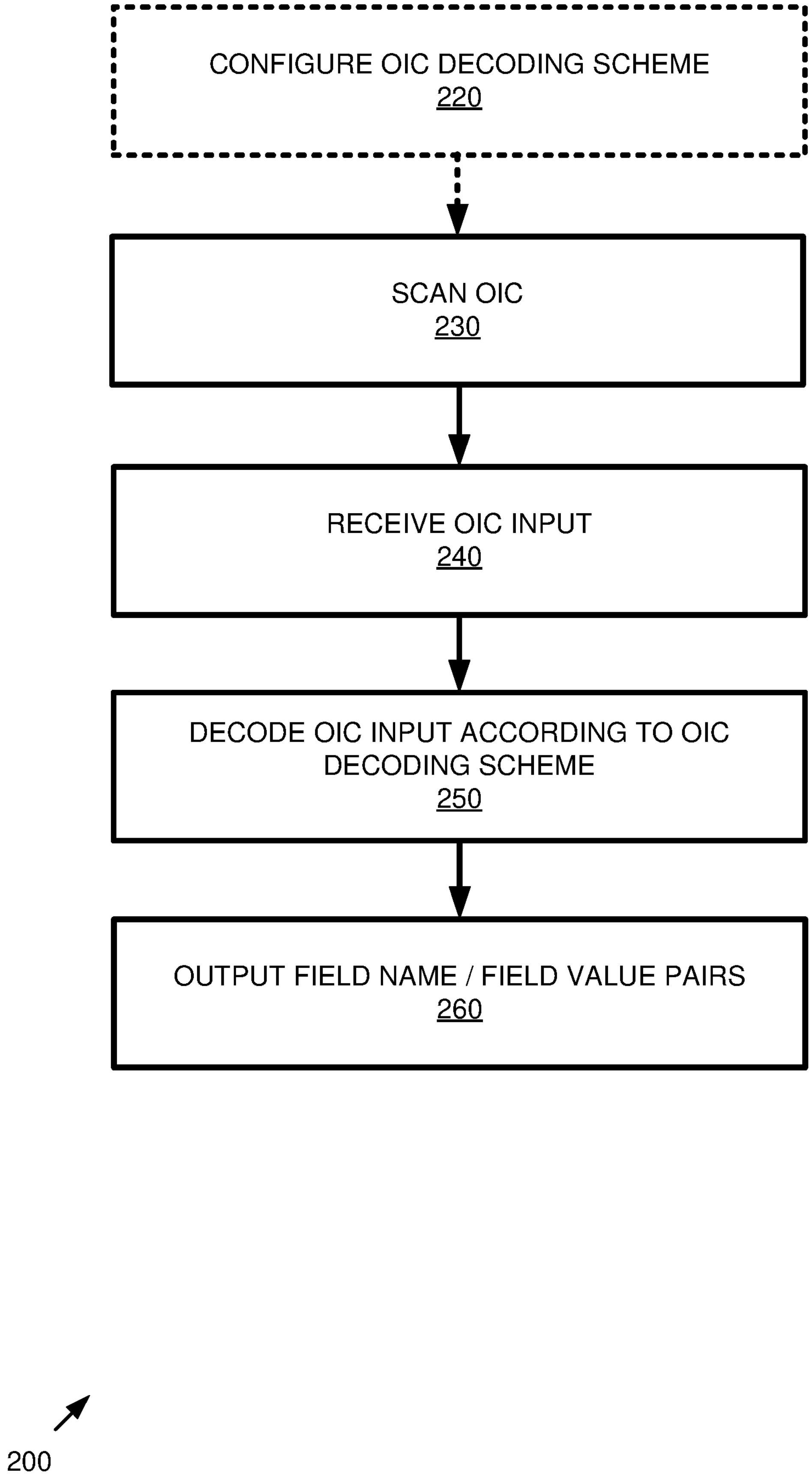
FIG. 2 is a flowchart of an example method of implementing object identification code decoding schemes via regular expressions.

Example 3—Example Method Implementing Object Identification Code Schemes Via Regular Expressions FIG. 2 is a flowchart of an example method 200 of object identification code decoding schemes via regular expressions and can be performed, for example, by the system of FIG. 1. The automated nature of the method 200 can be used in a variety of object identification code decoding situations such as scanning objects, products, materials, or the like.

In the example, at 220, the object identification code decoding scheme is configured. As described herein, configuration can be achieved by editing non-programming code text. Regular expressions can be stored as associated with field names. Such configuration can be done beforehand, whether by a third party or the same party performing decoding.

At 230, an object identification code is scanned. Any of a variety of object identification code readers, apps, smartphones, or the like can be used to scan a barcode, RFID tag, NFC tag or device, or the like and generate a string representation of the object identification code. The string represents data encoded into the object identification code at an encoding stage (not shown).

At 240, the object identification code input string is received as input.

At 250, the object identification code input string is decoded according to an object identification code decoding scheme as represented by an object identification code decoding scheme definition comprising regular expressions as described herein.

At 260, field name, field value pairs for fields are output as results of the decoding.

The results can be used for further activities, such as populating a database, performing inventory operations, completing fields in a user interface, or the like.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, receiving an input string can be described as sending a string depending on perspective.

Example 4—Example Object Identification Codes

In any of the examples herein, an object identification code can take any of a variety of forms, including barcodes, radio frequency identification codes (e.g., as stored in an RFID tag), NFC codes (e.g., as stored in an NFC tag of other NFC source), and the like. For example, any auto ID technology can benefit from the described technologies. The source of an object identification code lies in a physical tag or hardware device and can be read with a hardware scanner, whether in the form of dedicated scanner hardware or a computing system (e.g., smartphone, desktop, laptop, tablet, or the like) that has reader hardware (e.g., a camera, radio, or the like) and is programmed to acquire object identification codes from a source.

The hardware scanner scans the label, tag, or device and provides a string that can be processed as described herein. Although some examples describe barcodes and barcoding scheme definitions, instead of a barcode decoding scheme, an RFID decoding scheme or NFC decoding scheme and associated definitions can be supported.

Object identification codes can be used in a wide variety of scenarios involving tracking or tracing of materials or products in manufacturing, logistics, retail, inventory management, or the like.

Example 5—Example Barcodes

In any of the examples herein, a barcode can take any of a variety of forms, including one-dimensional barcodes, two-dimensional or matrix barcodes (e.g., QR codes), or the like. A barcode comprises a machine-readable optical label (e.g., printed, displayed, or the like) that contains information, such as information about the item to which it is attached, a current condition, a geographical location, a process step, or the like.

In any of the examples herein, although the language of "barcode" is used, the technologies can be applied to RFID, NFC, or other auto ID scenarios. For example, a barcode decoding scheme definition can be implemented as an object identification code decoding scheme definition in an RFID or NFC context.

Example 6—Example Regular Expression

In any of the examples herein, a barcode decoding scheme definition can comprise a regular expression. A regular expression comprises a sequence of characters that specifies a match pattern in a string (text). Such regular expressions can be used as a pattern to match against input barcode strings.

Regular expressions can follow a regular expression syntax, including support for capture groups and backreferences, which can be used to indicate the portion of the string that is to be extracted as a field value for the field.

Regular expression syntax can specify literal matches (e.g., "240"), that require a character-for-character match. However, the syntax can also specify character ranges, string lengths, and various other ways of pattern matching.

Regular expression syntax can support metacharacters such as caret ("^") to indicate the starting position within a string; period (".") to match any single character, bracket expression ("[ ]") that matches a single character contained within the brackets (e.g., "[abc]"), dollar sign ("$") to match the ending position, and the like.

In practice, various different forms of regular expressions can be used. Examples include those specifying delimiters, character ranges, and the like.

The regular expressions can be stored as part of the barcode decoding scheme definition as described herein.

In any of the examples herein, complex regular expressions can be supported. For example, expressions with plural patterns, capture groups, and the like can be supported. Expressions indicating a starting position within a string, one or more matching patterns, and a delimiter (e.g., delimiter character) can be supported.

In practice, matching patterns can include those matching alphabetic, numeric, alphanumeric, and special characters (e.g., excluding regular expression metacharacters, for which special provisions can be made).

As described herein, regular expressions can be used to implement variable-size fields, fixed-size fields, delimiters between fields, and the like.

Example 7—Example Non-Programming-Code Text

In any of the examples herein, non-programming-code text (e.g., a regular expression) can be edited to configure the barcode decoding scheme definition. Such non-programming-code can be free of programming code statements such as "if" "then" "else" and the like.

Having a no-code configuration option can open the possibility of non-programmers being able to configure the definition. Further, even programmers can benefit from such an approach because the definition is more easily understandable and can be reviewed more easily.

Thus, configuration can be achieved declaratively without any programming skills.

Example 8—Example Barcode Decoding Scheme Definition

As shown in the examples herein, the barcode decoding scheme definition can take the form of regular expression, field name pairs. A given regular expression is mapped to a respective field name. The definition can thus comprise an ordered sequence of regular expressions that are mapped to field names.

As described herein, the barcode decoding scheme definition is configurable via editing non-programming-code text representing the definition (e.g., the regular expressions, the field names, the mapping, or the like).

The regular expression can contain a capture group or backreference that indicates what text is to be extracted as the field value. When a string matches the given regular expression, the extracted text can be used as a field value for the field name to which the regular expression is mapped.

The regular expression, field name pairs can be referred to as "rules" because they specify how the barcode is to be decoded. A regular expression can be associated with (e.g., mapped to) a field name via a value, pointer, or by virtue of position or that they appear in the same rule.

A barcode decoding scheme definition can support additional features. For example, a rule can also include a sequence number to assist in ordering, a field indicating whether to remove leading zeros from the field value, whether additional checks, should be done (e.g., validate field value type or format), or the like.

During processing, the rules can be reordered. For example, a rule that matches can be placed at the end of the list upon matching. Thus, the definition can support ordered fields (e.g., the order in which the field appears in the string affects what field it represents).

As described herein, a parser can implement decoding according to the scheme.

Due to the flexibility of regular expressions, the definition can support variable length fields, variable length fields with a maximum length, fixed length fields, fixed sequences for fields, re-used delimiters, unique delimiters, and the like.

As described herein, a plurality of definitions can be supported. The barcode decoding scheme definition used for decoding can be chosen based on an application identifier identifying an application invoking the barcode decoding. Such an identifier can be passed explicitly or implicitly (e.g., the identifier is that of the calling application).

Example 9—Example Parser

In any of the examples herein, the parser can operate as described to work its way through the input string, applying the regular expressions of the barcode decoding scheme definition to extract the field values and output field name, field value pairs that represent a decoding of the barcode according to the barcode decoding scheme as defined.

In any of the examples herein, the parser can loop over the regular expressions in order (e.g., they can be ordered by order of appearance, by a counter, or the like). The parser tries to match a given regular expression with the barcode content (e.g., barcode input string). A regular expression contains a capture group (e.g., defined with opening and closing parenthesis). If a match is found, the complete match is removed from the barcode input string. The content of the capture group is transferred as a field value for the field name associated with (e.g., mapped to, in the same rule, or the like) the regular expression. The field value can then be further processed and validated.

If the parser attempts to find a match against the regular expressions and fails (e.g., no regular expression in the definition matches), an error condition can be raised. For example, if the barcode input string has not been exhausted (e.g., there still remains string contents), and no regular expression of the definition matches, an error condition can be raised.

The parser can be further configured to perform a rich set of operations such as validating field types, remove leading zeros, and the like. Ordered fields (e.g., order within the barcode determines field), single-occurrence, and multi-occurrence field instances can be supported.

Thus, the barcode parser can support order-based barcode decoding scheme definitions. The parser can support multiple matches against a given field name, regular expression pair in the input bar code (e.g., and extract them).

As shown herein, the barcode parser supports reuse of a same delimiter for a plurality of fields, which can be applied in an order-based scenario.

The barcode decoding scheme definition can take the form of a series of rules implemented as regular expression, field name pairs. Such rules are then applied to the string as described herein during the decoding process.

Regular expression logic can be included to recognize regular expression matches within strings. Such logic can start at the beginning of the string and apply the regular expression until a match fails or succeeds. Capture group (e.g., backreference) functionality can be used to extract the field value.

As described herein, the parser implements a barcode decoding scheme according to the barcode decoding scheme definition. Editing the barcode decoding scheme definition customizes the barcode decoding scheme by editing (e.g., changing or inputting) non-programming-code text only (e.g., without writing or editing programming code). For example, adding a new regular expression, new field name pair to the barcode decoding scheme definition extends the bar code decoding scheme to recognize data in the input barcode for the new field name.

Example 10—Example Recursive Execution

In any of the examples herein, recursion can be used to decode the barcode. For example, a parsing function within a parser can process the first part of the input string, extract it from the string, and pass the remaining part of the string to itself, which then processes the remaining part of the string in a similar manner. When there are no more characters left in the string, the recursion can stop.

The parsing function can parse the first part of the barcode string, trigger any validations, remove the first part of the barcode string (e.g., that comprises the field value) and call itself with the remaining barcode string.

Another way of describing the process is that the barcode is decomposed into different parts. At the start, the input string comprises a plurality of fields. The string is then decomposed into separate fields, which are then indicated as output.

Example 11—Example Results

In any of the examples herein, results can take the form of field name, field value pairs. For example, a table with the field name and value pairs can be provided as output to the decoding process. An application taking advantage of the technologies can be provided such a table and further process the output as appropriate.

The table can be provided as a database table, JSON, XML, or the like.

Example 12—Example Interface with Application

In any of the examples herein, an application can take advantage of the technologies, which decode the barcode input and map its content to input fields of the application. In a web application environment, customizing tables can store the configuration data (e.g., barcode decoding scheme definition) and be linked by a library to an application. When the application takes advantage of the technologies, the correct decoding scheme and fields are already put in place; field names recognized by the application can thus be provided as results.

Because of the ease of integration with applications, more applications can take advantage of the technologies, which offer a rich set of barcode decoding possibilities that can be customized for a variety of applications.

Example 13—Example Mapping to Workflow Semantics

In any of the examples herein, the technologies can map fields in the barcode to global field names that have defined semantics within an enterprise resource planning system comprising a database system. For example, in a multitenant cloud-based environment, a governance mechanism can be provided by which new global field names are granted, and such field names can be unique across a domain. A rich set of functionality can be associated with a global field name. For example, functionality such as currency conversion, business process workflow, inventory update, and the like can be automatically executed when manipulating such global field names. Further, such functionality can be customized to be unique for a tenant and differ from tenant to tenant, based on having a different global field name.

If the barcode input string comprises a field value for the global field name, the technology can store the field value for the global field name in a database.

The ability to map fields in barcodes to such global field names can be particularly valuable because barcode functionality can be used as a means to trigger workflows, input data to forms, and the like. In practice, such an approach otherwise requires coding and is difficult to maintain.

However, using global field names in conjunction with barcodes as described herein can provide flexible, durable processing in an enterprise resource planning environment.

Further, a user interface can be provided by which configuration can specify a field name (e.g., global field name) as a destination for a decoded value from the barcode. The choices can be limited to those global field names appropriate in the context (e.g., for the tenant, application, or the like). Thus, configuration of the system can be easily achieved without having to engage in programmatic coding. The field name can be of a database table selected from a user interface of a relational database management system managing the database table.

Example 14—Example System with Barcode Decoding Scheme Definition

Figure 3:
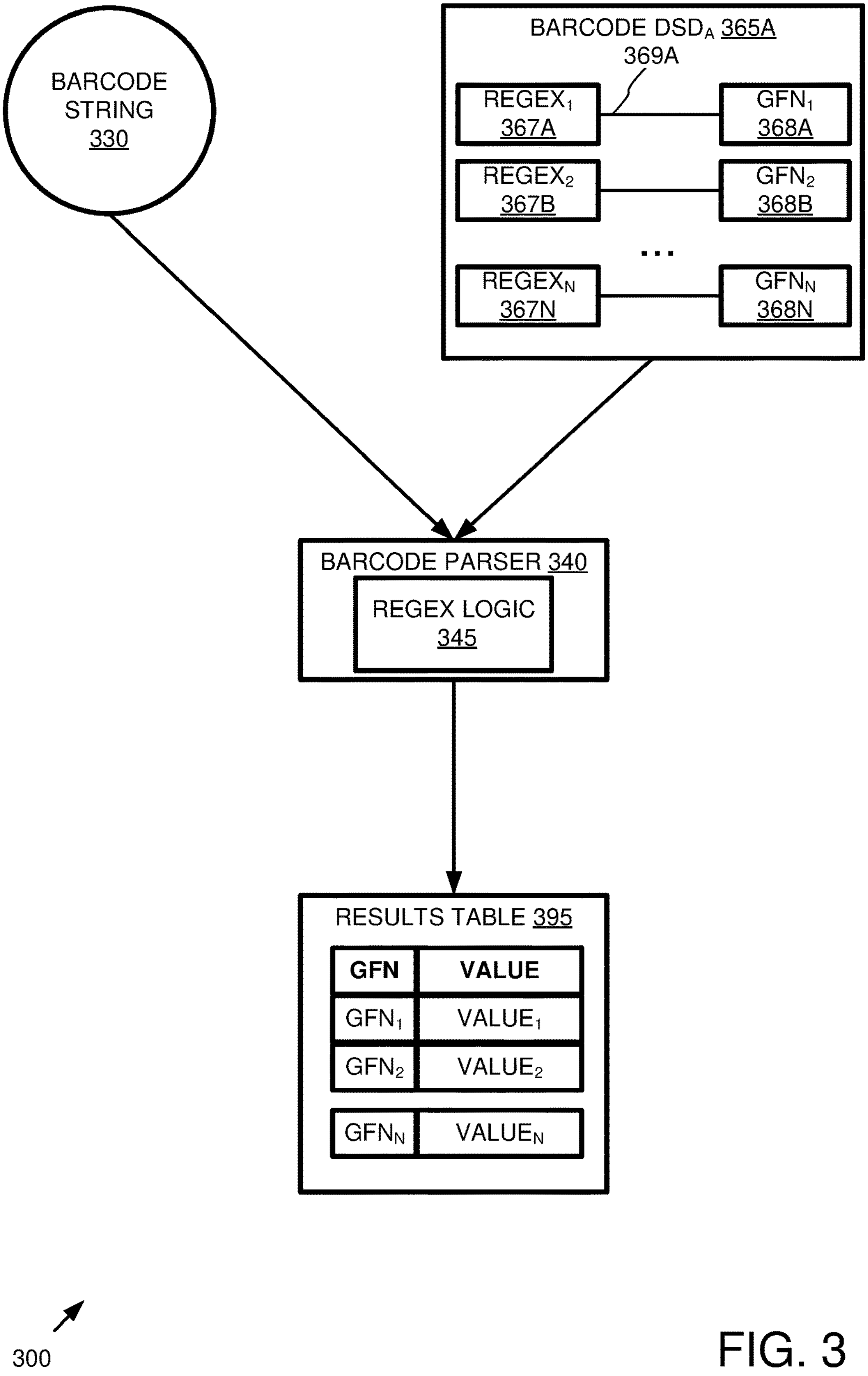
FIG. 3 is a block diagram of an example system decoding a barcode string via a barcode decoding scheme definition comprising regular expressions.

FIG. 3 is a block diagram of an example computing system 300 decoding a barcode string 330 via a stored internal representation of a barcode decoding scheme definition 365A comprising regular expressions 367A-N and field names 368A (e.g., regular expression, field name pairs that map regular expressions to respective field names). Such a system 300 can output the results 395 as a table as described herein. The system 300 can comprise at least one hardware processor and at least one memory coupled to the at least one hardware processor.

A barcode parser 340 can be situated as shown in FIG. 1 and operate to apply the regular expression logic 345 to decode the string 330, which can be situated as shown in FIG. 1. The barcode parser is configured to accept the barcode input string 330 and the barcode decoding scheme definition 365A as input and parse the barcode input string 330 according to the definition 365A as specified in the regular expression, field name pairs, outputting field name, value pairs based on regular expression pattern matches found in the barcode input string.

The logic 345 can start at the beginning of the string 330 and apply regular expression semantics (e.g., pattern matching) using the regular expressions 367A-N in the definition 365A. When a match occurs, a field value can be extracted and used as the field value for the field name to which the regular expression is mapped. The parsing function of the parser 340 can then call itself repeatedly (e.g., recursively) with the remaining portion of the string 330, until the string is exhausted.

When a given regular expression is satisfied, the field value is extracted from the string 330 and the field value is output along with the field name 368A-N to which the regular expression was mapped 369A. An entry in the results table 395 can indicate the field name, field value pair for the field. Decoding can then proceed with the remaining portion of the barcode string 330, resulting in additional entries in the table 395. When the string is exhausted, the results table 395 represents a complete decode of the input string 330. As described herein, if any string remains after attempting matches against the definition 365A, an error can be raised.

As described herein, the definition 365A can be chosen based on a mapping from an application performing the decoding to the definition 365A.

Figure 4:
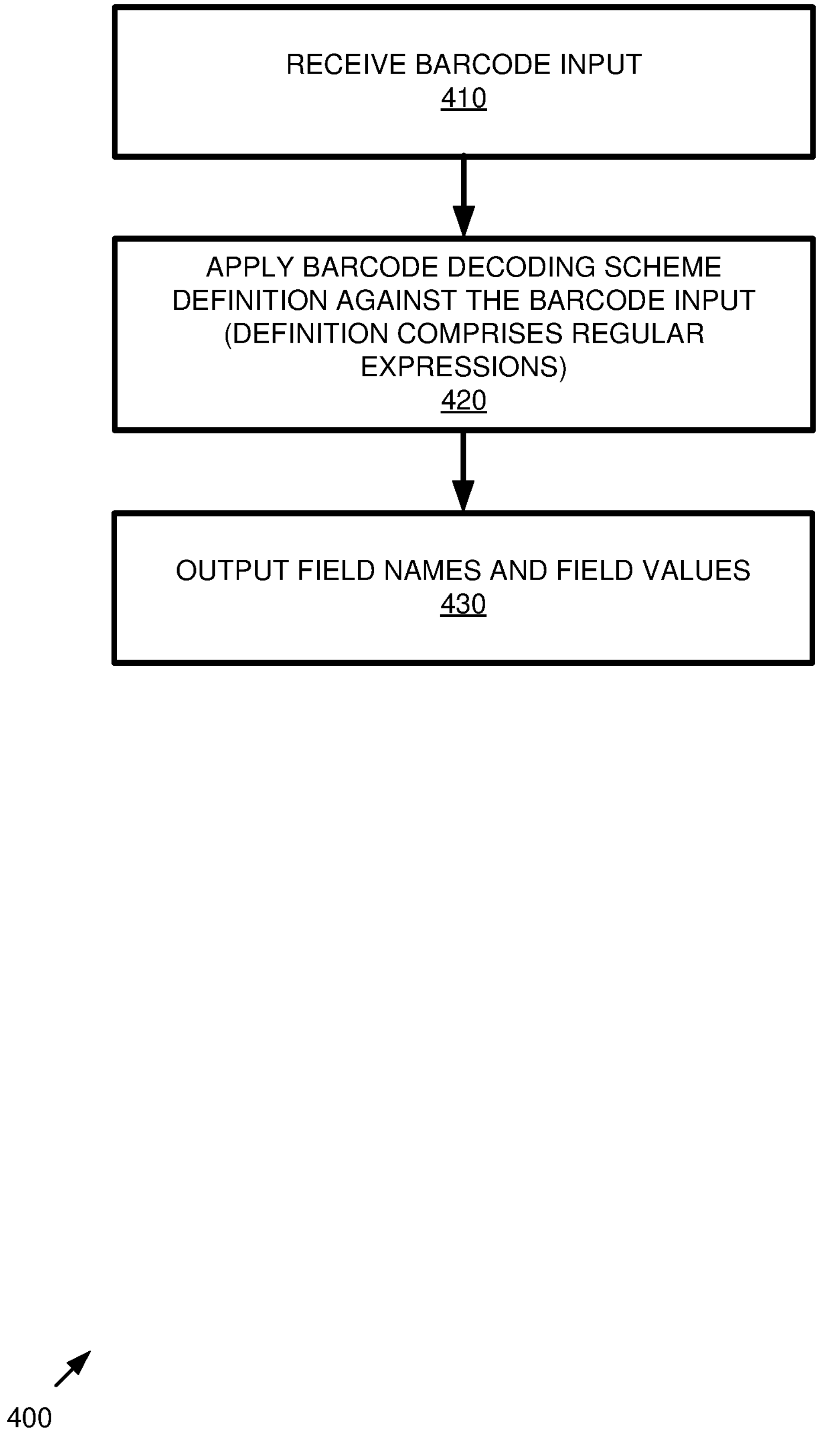
FIG. 4 is a flowchart of an example method of decoding a barcode string via a barcode decoding scheme definition comprising regular expressions.

Example 15—Example Method of Decoding Barcode Via Barcode Decoding Scheme Definition FIG. 4 is a flowchart of an example method 400 of decoding a barcode string via a barcode decoding scheme definition comprising regular expressions and can be implemented in any of the examples herein (e.g., the system shown in FIG. 3). The method 400 can achieve the acts 240-260 of FIG. 2.

At 410, a barcode input string is received. Such a string can be situated as shown in FIG. 1 or 3. As described herein, the barcode input string represents a scanned barcode. As part of the barcode creation process (not shown), information is placed in the barcode. Decoding extracts the information placed in the barcode.

At 420, the barcode decoding scheme definition is applied against the barcode input string. As described herein, the definition can be repeatedly applied. As described herein, the definition comprises regular expressions.

For example, a parser as shown herein can be used to apply the definition against the barcode input string. The parser can apply the regular expressions to extract field values from the input string. When a match is found, the field value is extracted, and the field name is deemed to be that associated (e.g., mapped to) in the definition from the regular expression. If the regular expression, field name pair is considered a rule, the two can be associated with each other by virtue of appearing in the same rule. The barcode decoding scheme definition thus comprises configuration information mapping the regular expressions to respective field names.

As described, repeated application of the definition against the string can be implemented until the string is exhausted. For example, a parsing function in the parser can call itself recursively with the remaining (e.g., undecoded) portion of the barcode input string.

Repeatedly applying the definition identifies fields with field values in the barcode input string with the regular expression of the barcode decoding scheme definition. The fields have respective field names as indicated in the definition. Portions of the barcode matching patterns in the regular expression can be extracted as the field values. As described herein, additional notation (e.g., a capture group with parenthesis) can be used to indicate which portion of the match is the actual field value.

The method 400 thus identifies a field having a field name, wherein the field name is indicated in the definition, and the field is present in the barcode input string. The field value is extracted from the string using the regular expressions.

At 430, the field names and respective field values are output as results as described herein.

Example 16—Example Cross Compatibility

In any of the examples herein, the barcode decoding scheme definition can be a first definition defining a GS1-compliant barcode decoding scheme. The system can further comprise a second definition defining a non-GS1-compliant barcode decoding scheme. In other words, the technologies can support a mix of both GS1-compliant and non-GS1-compliant definitions. Extensions to or departures from GS1 can be supported, such as order-based schemes, repeating fields, or the like.

Example 17—Example Execution

Figure 5:
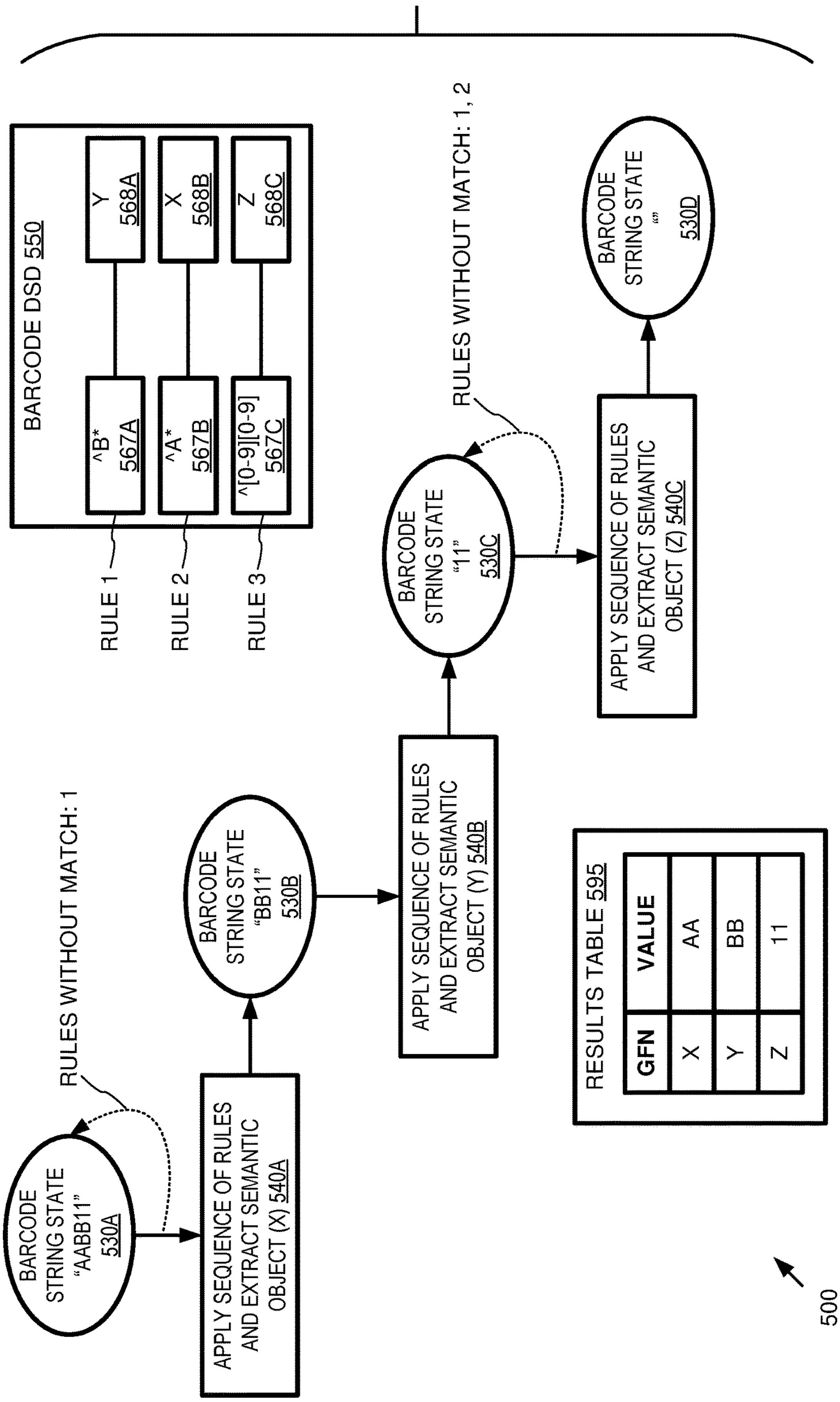
FIG. 5 is a block diagram of an example execution of a barcode decoding scheme definition against a barcode input string.

FIG. 5 is a is a block diagram of an example execution 500 of a barcode decoding scheme definition 550 against a barcode input string 530A. In the example, a barcode input string "AABB11" 530A is input to a parser using along with the definition 550 comprising three rules having regular expressions 567A-C and respective field names 568A-C. The result is shown as the results table 595.

Starting at 530A, the barcode string state is "AABB11," and the sequence of rules is applied 540A to extract a semantic object. One rule does not match (rule 1), but the second rule does match (e.g., ^A* matches AA), so the object X is extracted having a value "AA." The result is output as a field name, value pair: (X, AA).

The remaining portion of string ("BB11") 530B is then analyzed by applying the rules again 540B. The first rule matches (e.g., ^B* matches BB), so the object Y is extracted having a value BB. The result is output as a field name, value pair: (Y, BB).

The remaining portion of string ("11") 530C is then analyzed by applying the rules again 540C. The first two rules do not match, but the third one does (^[0-9] [0-9] matches 11), so the object Z is extracted having value 11. The result is output as a field name, value pair: (Z, 11).

The barcode string state is then the empty string at 530D, and parsing can stop.

The results are placed into the results table 595 and provided as output of the barcode decoding process to the calling application.

Although not shown, the regular expressions 567A-C can include capture groups (e.g., "( )" or other characters to achieve extraction).

Repeated application of the rules can be achieved via recursion as described herein.

Example 18—Example Detailed Method Decoding a Barcode

Figure 6:
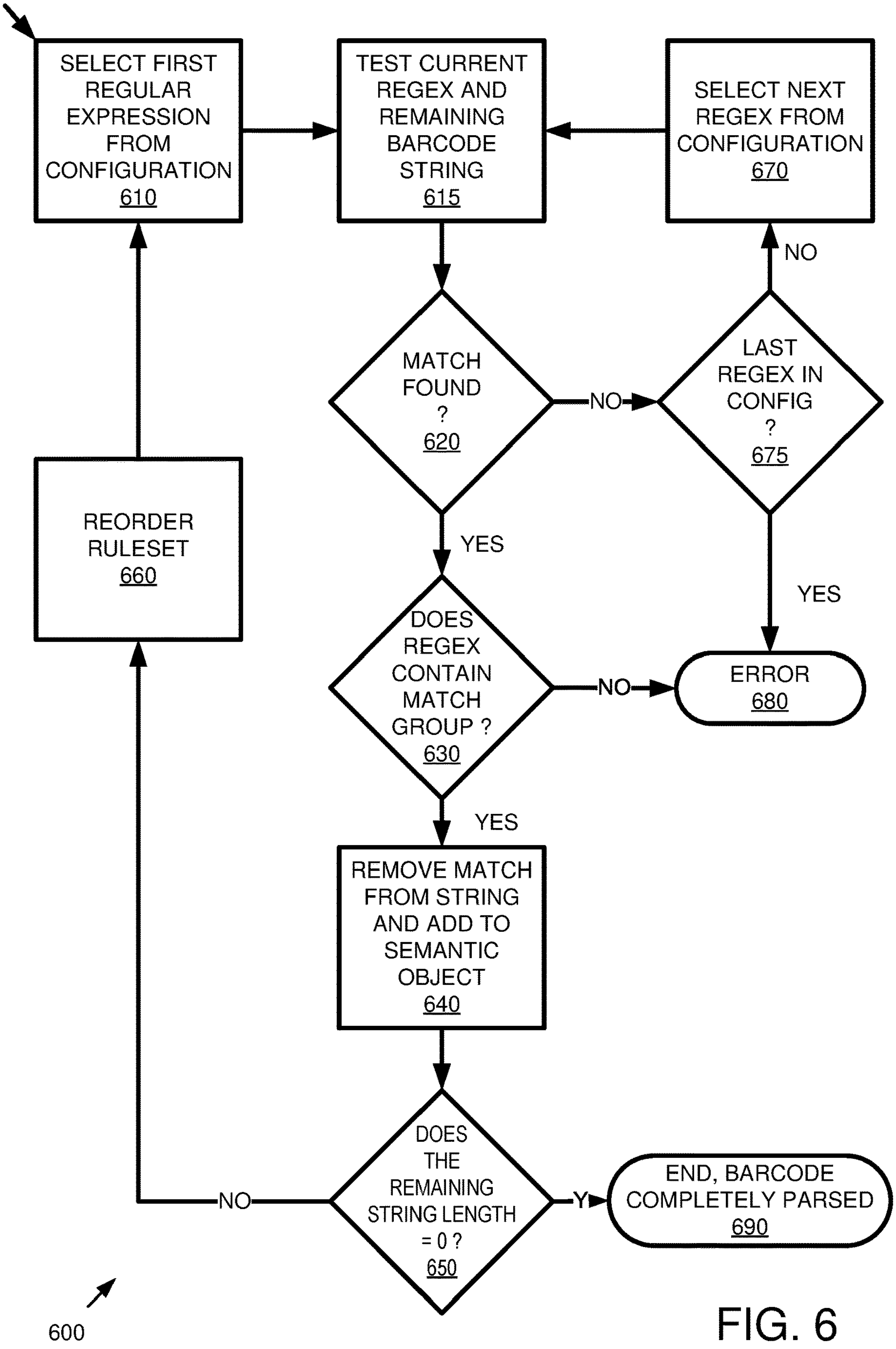
FIG. 6 is a flowchart of an example detailed method of decoding a barcode.

FIG. 6 is a flowchart of an example detailed method 600 of decoding a barcode and can be performed, for example, by the systems of FIG. 1 or 3. The method 600 assumes a string has been provided as input and that a set of regular expressions from a configuration defining the barcode decoding scheme (e.g., a definition) is available.

In the example, starting at 610, a first regular expression from the configuration is selected.

Then, at 615, the current regular expression is tested against the remaining barcode string (e.g., in the first pass, it will be the entire string).

At 620, if a match is not found, it is determined whether it was the last regular expression in the configuration (e.g., the last rule). If not, the next regular expression is selected at 670, and the method continues at 615.

Otherwise, at 675, if it is indeed the last regular expression in the configuration, an error is generated at 680 because string remains, but no rule matches.

However, if a match is found at 620, it is determined at 630 whether the regular expression contains a capture group. If not, an error is generated at 680.

Otherwise, there is a capture group, and at 640, the match is removed (e.g., extracted) from the string and the contents of the capture group is added to the semantic object (e.g., the field name mapped to by the regular expression and the field value extracted for the field are stored as results).

Continuing at 650, it is determined whether any string remains. If not, at 690, the barcode is completely parsed.

Otherwise, optionally, at 660, the ruleset can be reordered. In some implementations, such a reordering supports field ordering within the barcode (e.g., a field's position within the barcode determines its field name).

Execution can then continue back at 610 with the remainder of the string.

As shown, after each match, the ruleset can be reordered. Rules that have already matched can be moved to the end of the ruleset. In this way, untested rules are tested before the already tested ones. In ordered scenario, a first field will be matched before the rule for the second field is applied.

One could keep track of which rule was already successfully matched, but it is not required. Also, the rule configuration can include a "Execute rule only once" setting. Such a flag can cause an error to be raised if the rule matches twice (e.g., after being reordered as described). Such an error could communicate "Field is contained twice in the barcode!" or a similar message. Thus, for the barcode decoding scheme definition, a given field with a given field name can appear only once in the barcode input string. Subsequent appearances (e.g., beyond the first) in the barcode input string can cause an error to be raised (e.g., by the parser). Or, alternatively, such a constraint can be a default.

There are use cases where the rules are allowed to match multiple times. For example, the same field may be allowed to appear twice in the same barcode. The output can then simply indicate two entries for the same field.

In practice, some features can be omitted, and additional processing to support field type checking, removing leading zeros, and the like can be implemented.

The resulting output can be a table of field name, field value pairs as described herein. Such output can be consumed by an application to support barcode decoding in the application.

Example 19—Example Decoded Output

FIG. 7 is a block diagram of an example barcode decoding scheme definition 710, a barcode input string 750, and the decoded output 795. For each rule, the definition 710 shows a counter 720A, field name 720B, whether to remove leading zeros 720C, whether additional checks are to be performed 720D, and the actual regular expression 720E used for matching.

The barcode input string 750 is processed by a parser using the barcode decoding scheme definition 710 as described herein.

As a result, the output is the results table 795, showing that fields for material, batch, and serial number have been identified and extracted from the input string 750.

In the example, ordered decoding is used, with the same delimiter (' #') used between the fields. The first field is identified as "material" by virtue of being the first field in the string (e.g., matching the regular expression) followed by the delimiter. The second field is identified as "batch" by virtue of being the second field in the string followed by the delimiter. The third field "serial number" is denoted as being the last field (e.g., by the '$').

In practice, any number of ordered fields can be supported. Optional fields, fixed length fields, and the like can also be supported as described herein.

Example 20—Example Barcode Decoding Scheme Definition Instance

FIG. 8 is block diagram 800 of an example barcode decoding scheme definition 810 that can be used in any of the examples herein. In the example, for each rule, the definition 810 comprises fields for a counter 820A, field name 820B, whether to remove leading zeros 820C, whether there are additional checks 820D, and the actual regular expression 820E.

As shown, the additional checks can include whether to validate the field against specified types or formats. Examples include whether the check digit is correct (e.g., field is of digits according to modulo 10), whether the field is of standard date format, or the like. Different date formats (e.g., YYMMDD, DDMMYY, or the like) can be supported.

As shown, variable length fields can be supported via the {n,m} feature, which indicates that the field can be n-m characters in length.

Example 21—Example Fixed Order Barcode Decoding Scheme Definition

The technologies can support a wide variety of other scenarios, and the possibilities are virtually endless. Another possible example is using different separators (e.g., delimiters) to specify different fields. For example, consider a decoding scheme as follows:

TABLE 1

| Decoding Scheme | | | | | | |
|---|---|---|---|---|---|---|
| Material | Separator 1 | Batch | Separator2 | Quantity | Separator3 | Quantity-Unit |
| Abc | X | DSL | Y | 10 | Z | KG |

Given an input string of (AbcXDSLY10ZKG) with separators being X, Y, Z (or other suitable characters). Regular expressions can be defined to find strings ending in X as "Material," strings ending in Y as "Batch," strings ending in Z as "Quantity" and the end of the overall string as "Quantity Unit." In such a scenario, the following output results:

TABLE 2

| Extracted Values | |
|---|---|
| Field | Value |
| Material | Abc |
| Batch | DSL |
| Quantity | 10 |
| Quantity Unit | KG |

Example 22—Example Raw Data

In any of the examples herein, raw data from a scanner (e.g., direct output from a barcode read) can be used instead of data that is already preprocessed (e.g., to convert physical barcode artifacts into ASCII characters). For example, parts of the physical barcode itself can be included in the raw data, which is typically converted to an ASCII string.

Example 23—Example Advantages

A number of advantages can be achieved via the technologies described herein. A wide variety of decoding schemes can be supported, including those following standards such as the GS1 decoding standard. However, custom schemes that extend or depart from the GS1 standard can also be supported. Completely independent decoding schemes can be implemented to meet whatever needs exists in the barcode decoding space. For example, order-based, fixed length, repeating fields, and the like can be supported as described herein.

Further, such schemes can be configured and implemented without programmatic coding, providing access to functionality to those without the skill or inclination to perform coding. Such an approach considerably improves reliability, accuracy, and compatibility because the inevitable issues related to coding are avoided.

Thus, the technologies can greatly reduce the number of errors, increasing reliability, and leading to more widespread use of barcodes in various domains.

Other advantages are possible.

Example 24—Example Implementations

Any of the following can be implemented.

Clause 1. A computer-implemented method comprising:

receiving an object identification code input string representing a scanned object identification code;

repeatedly applying an object identification code decoding scheme definition against the object identification code input string, wherein the object identification code decoding scheme definitions comprises a plurality of regular expressions and the repeatedly applying identifies fields with field values in the object identification code input string with the regular expressions of the object identification code decoding scheme definition, wherein the fields have respective field names; and outputting the field names and field values.

Clause 2. The method of Clause 1, wherein:

repeatedly applying the object identification code decoding scheme definition comprises recursively calling a parsing function.

Clause 3. The method of any one of Clauses 1-2, wherein:

the object identification code decoding scheme definition comprises configuration information mapping the regular expressions to respective field names.

Clause 4. The method of any one of Clauses 1-3, wherein:

portions of the object identification code input string matching patterns in the regular expressions are extracted as the field values.

Clause 5. The method of any one of Clauses 1-4, wherein:

for the object identification code decoding scheme definition, a given field with a given field name can appear only once in the object identification code input string; and subsequent appearances in the object identification code input string cause an error to be raised.

Clause 6. The method of any one of Clauses 1-5, wherein:

the field names comprise a global field name having defined semantics within an enterprise resource planning system;

the object identification code input string comprises a field value for the global field name; and the method further comprises:

storing the field value for the global field name in a database.

Clause 7. The method of any one of Clauses 1-6, wherein:

the field names comprise a field name of a database table selected from a user interface of a relational database management system managing the database table.

Clause 8. The method of any one of Clauses 1-7, wherein:

the object identification code decoding scheme definition is configurable via editing non-programming-code text representing the definition.

Clause 9. The method of any one of Clauses 1-8, further comprising:

choosing the object identification code decoding scheme definition based on an application identifier identifying an application invoking object identification code decoding.

Clause 10. The method of any one of Clauses 1-9, wherein:

the object identification code decoding scheme definition supports order-based fields within the object identification code input string.

Clause 11. The method of any one of Clauses 1-10, wherein:

the object identification code decoding scheme definition supports multiple occurrences of a same field within the object identification code input string.

Clause 12. The method of any one of Clauses 1-11, wherein:

the object identification code input string represents direct output from an object identification code read.

Clause 13. A computing system comprising:

at least one hardware processor;

at least one memory coupled to the at least one hardware processor;

a stored internal representation of an object identification code decoding scheme definition, wherein the object identification code decoding scheme definition comprises a plurality of regular expression, field name pairs that map regular expressions to respective field names;

an object identification code parser configured to accept an object identification code input string and the object identification code decoding scheme definition as input, wherein the object identification code parser is configured to parse the object identification code input string according to the object identification code decoding scheme definition as specified in the regular expression, field name pairs, wherein the object identification code parser is configured to output field name, value pairs based on regular expression pattern matches found in the object identification code input string.

Clause 14. The system of Clause 13, wherein:

when parsing the bar code input string, an object identification code parser function of the object identification code parser calls itself recursively.

Clause 15. The system of any one of Clauses 13-14, wherein:

the stored internal representation of an object identification code decoding scheme definition is a first definition defining a GS1-compliant object identification code decoding scheme; and the computing system further comprises a second stored internal representation of an object identification code decoding scheme definition, wherein the second definition defines a non-GS1-compliant object identification code decoding scheme.

Clause 16. The system of any one of Clauses 13-15, wherein:

the object identification code parser supports order-based object identification code decoding scheme definitions.

Clause 17. The system of any one of Clauses 13-16, wherein:

an object identification code parser function of the object identification code parser supports multiple matches against a given field name, regular expression pair in the bar code input string.

Clause 18. The system of any one of Clauses 13-17, wherein:

the object identification code parser supports reuse of a same delimiter for a plurality of fields.

Clause 19. The system of any one of Clauses 13-18, wherein:

the object identification code parser implements an object identification code decoding scheme according to the object identification code decoding scheme definition; and editing the object identification code decoding scheme definition customizes the object identification code decoding scheme by editing non-programming-code text only.

Clause 20. One or more non-transitory computer-readable media comprising computer-executable instructions that, when executed by a computing system, cause the computing system to perform operations comprising:

receiving a barcode input string representing a barcode scanned by a barcode scanner;

repeatedly applying a barcode decoding scheme definition against the barcode input string, wherein the repeatedly applying identifies global field names and field values in the barcode input string based on regular expressions in the barcode decoding scheme definition; and outputting the global field names and field values;

wherein the barcode decoding scheme definition comprises configuration information mapping the regular expressions to respective global field names; and wherein the barcode decoding scheme definition is configurable via editing non-programming-code text representing the barcode decoding scheme definition.

Clause 21. One or more non-transitory computer-readable media comprising computer-executable instructions that, when executed by a computing system, cause the computing system to perform the method of any one of Clauses 1-12.

Example 25—Example Computing Systems

Figure 9:
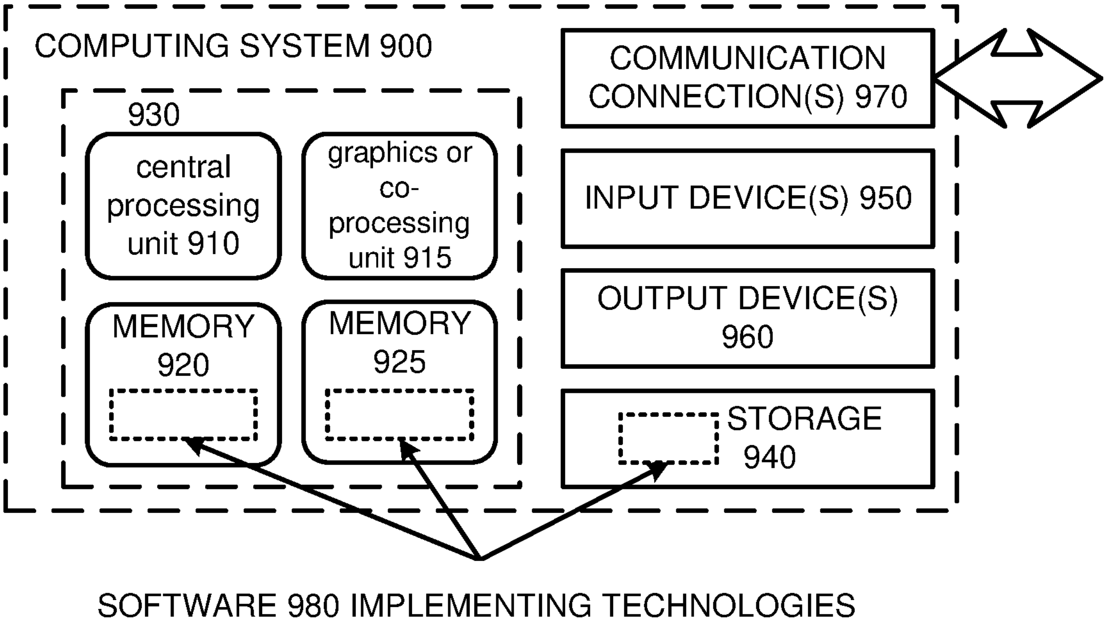
FIG. 9 is a block diagram of an example computing system in which described embodiments can be implemented.

FIG. 9 depicts an example of a suitable computing system 900 in which the described innovations can be implemented. The computing system 900 is not intended to suggest any limitation as to scope of use or functionality of the present disclosure, as the innovations can be implemented in diverse computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 can be volatile memory (e.g., registers, cache, RAM), non-volatile memory (e.g., ROM, EEPROM, flash memory, etc.), or some combination of the two, accessible by the processing unit(s) 910, 915. The memory 920, 925 stores software 980 implementing one or more innovations described herein, in the form of computer-executable instructions suitable for execution by the processing unit(s) 910, 915.

A computing system 900 can have additional features. For example, the computing system 900 includes storage 940, one or more input devices 950, one or more output devices 960, and one or more communication connections 970, including input devices, output devices, and communication connections for interacting with a user. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 can be removable or non-removable, and includes magnetic disks, magnetic tapes or cassettes, CD-ROMs, DVDs, or any other medium which can be used to store information in a non-transitory way and which can be accessed within the computing system 900. The storage 940 stores instructions for the software 980 implementing one or more innovations described herein.

The input device(s) 950 can be an input device such as a keyboard, mouse, pen, or trackball, a voice input device, a scanning device, touch device (e.g., touchpad, display, or the like) or another device that provides input to the computing system 900. The output device(s) 960 can be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 26—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 27—Example Cloud Computing Environment

Figure 10:
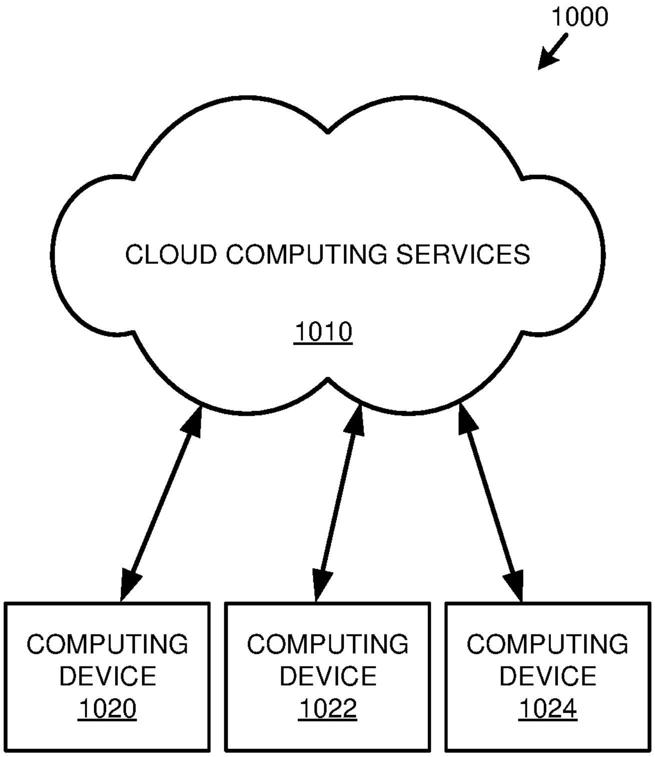
FIG. 10 is a block diagram of an example cloud computing environment that can be used in conjunction with the technologies described herein.

FIG. 10 depicts an example cloud computing environment 1000 in which the described technologies can be implemented, including, e.g., the system 100 of FIG. 1 and other systems herein. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operations (e.g., data processing, data storage, and the like).

In practice, cloud-based, on-premises-based, or hybrid scenarios can be supported.

Example 28—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 29—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method for improving automatic object identification code decoding, the method comprising:

- receiving an object identification code input string representing a scanned object identification code;
  - repeatedly applying, by a parser, an object identification code decoding scheme definition against the object identification code input string in an iterative process, wherein the object identification code decoding scheme definition comprises a plurality of regular expressions and respective field names, and wherein the iterative process is performed by a parsing function within the parser, which recursively calls itself with a current remaining portion of the object identification code input string to:
  - identify a field with a field value in the current remaining portion of the object identification code input string that matches at least one of the plurality of regular expressions; and
  - responsive to identifying the field with the field value, pair the field value with a field name corresponding to the at least one of the plurality of regular expressions to form a field name and value pair, and remove the field value from the current remaining portion of the object identification code input string, wherein the iterative process stops when the current remaining portion of the object identification code input string has no string content;

outputting one or more field name and value pairs formed during the iterative process to a calling software application that invoked decoding of the scanned object identification code; and automatically completing one or more input fields of the calling software application in a user interface of a relational database management system based on the one or more field name and value pairs.

2. The method of claim 1, wherein:

the object identification code decoding scheme definition comprises configuration information mapping the regular expressions to respective field names.

3. The method of claim 1, further comprising:

raising an error condition if the parser fails to find any field name and value pair during the iterative process.

4. The method of claim 1, wherein:

for the object identification code decoding scheme definition, a given field with a given field name can appear only once in the object identification code input string; and subsequent appearances in the object identification code input string cause an error to be raised.

5. The method of claim 1, wherein:

the field names comprise a global field name having defined semantics within an enterprise resource planning system;

the object identification code input string comprises a field value for the global field name; and the method further comprises:

storing the field value for the global field name in a database.

6. The method of claim 1, wherein: the field names comprise a field name of a database table selected from the user interface of the relational database management system managing the database table.

7. The method of claim 1, wherein: the object identification code decoding scheme definition is configurable via editing non-programming-code text representing the object identification code decoding scheme definition.

8. The method of claim 1, further comprising: choosing the object identification code decoding scheme definition based on an application identifier identifying the software application invoking the decoding of the scanned object identification code decoding.

9. The method of claim 1, wherein:

the object identification code decoding scheme definition supports order-based fields within the object identification code input string.

10. The method of claim 1, wherein:

the object identification code decoding scheme definition supports multiple occurrences of a same field within the object identification code input string.

11. The method of claim 1, wherein:

the object identification code input string represents direct output from an object identification code read.

12. A computing system for improving automatic object identification code decoding, the system comprising: at least one hardware processor;

at least one memory coupled to the at least one hardware processor;

a stored internal representation of an object identification code decoding scheme definition, wherein the object identification code decoding scheme definition comprises a plurality of regular expressions and respective field names;

an object identification code parser configured to accept an object identification code input string representing a scanned object identification code and the object identification code decoding scheme definition as input, wherein the object identification code parser is configured to repeatedly apply the object identification code decoding scheme definition against the object identification code input string in an iterative process, and wherein the iterative process is performed by a parsing function within the parser, which recursively calls itself with a current remaining portion of the object identification code input string to:

identify a field with a field value in the current remaining portion of the object identification code input string that matches at least one of the plurality of regular expressions; and responsive to identifying the field with the field value, pair the field value with a field name corresponding to the at least one of the plurality of regular expressions to form a field name and value pair, and remove the field value from the current remaining portion of the object identification code input string, wherein the iterative process stops when the current remaining portion of the object identification code input string has no string content, wherein the object identification code parser is configured to output one or more field name and value pairs formed during the iterative process to a calling software application that invoked decoding of the scanned object identification code; and an application a user interface configured to automatically complete one or more input fields of the calling software application based on the one or more field name and value pairs.

13. The system of claim 12, wherein:

the stored internal representation of the object identification code decoding scheme definition is a first definition defining a GS1-compliant object identification code decoding scheme; and the computing system further comprises a second stored internal representation of a second object identification code decoding scheme definition, wherein the second stored internal representation of the second object identification code decoding scheme definition is a second definition defining a-non-GS1-compliant object identification code decoding scheme.

14. The system of claim 12, wherein:

the object identification code parser supports order-based object identification code decoding scheme definitions.

15. The system of claim 12, wherein:

an object identification code parser function of the object identification code parser supports multiple matches against a given field name, regular expression pair in the object identification code input string.

16. The system of claim 12, wherein:

the object identification code parser supports reuse of a same delimiter for a plurality of fields.

17. The system of claim 12, wherein:

the object identification code parser implements an object identification code decoding scheme according to the object identification code decoding scheme definition; and editing the object identification code decoding scheme definition customizes the object identification code decoding scheme by editing non-programming-code text only.

18. One or more non-transitory computer-readable media comprising computer-executable instructions that, when executed by a computing system, cause the computing system to perform operations for improving automatic object identification code decoding, the operations comprising:

receiving a barcode input string representing a barcode scanned by a barcode scanner;

repeatedly applying, by a parser, a barcode decoding scheme definition against the barcode input string in an iterative process, wherein the barcode decoding scheme definition comprises a plurality of regular expressions and respective field names, and wherein the iterative process is performed by a parsing function within the parser, which recursively calls itself with a current remaining portion of the barcode input string to:

identify a field with a field value in the current remaining portion of the barcode input string that matches at least one of the plurality of regular expressions; and responsive to identifying the field with the field value, pair the field value with a field name corresponding to the at least one of the plurality of regular expressions to form a field name and value pair, and remove the field value from the current remaining portion of the barcode input string;

wherein the iterative process stops when the current remaining portion of the barcode input string has no string content;

outputting one or more field name and value pairs formed during the iterative process to a calling software application that invoked decoding of the scanned object identification code; and automatically completing one or more input fields of the calling software application in a user interface of a relational database management system based on the one or more field name and value pairs; and wherein the barcode decoding scheme definition is configurable via editing non-programming-code text representing the barcode decoding scheme definition.

* * * * *